US009158805B1

(12) United States Patent
Kalki et al.

(10) Patent No.: US 9,158,805 B1
(45) Date of Patent: Oct. 13, 2015

(54) STATISTICAL DATA QUALITY DETERMINATION FOR STORAGE SYSTEMS

(71) Applicant: AMAZON TECHNOLOGIES, INC., Reno, NV (US)

(72) Inventors: Santosh Kalki, Sammamish, WA (US); Adam Stephen Duncan, Seattle, WA (US); Jenny Bandy Freshwater, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 247 days.

(21) Appl. No.: 13/796,361

(22) Filed: Mar. 12, 2013

(51) Int. Cl.
*G06F 17/30* (2006.01)

(52) U.S. Cl.
CPC ................ *G06F 17/30371* (2013.01)

(58) Field of Classification Search
CPC ................. G06F 17/246; G06F 17/30336
USPC ........................................................ 707/694
See application file for complete search history.

(56) References Cited

U.S. PATENT DOCUMENTS

| 8,019,737 | B2 * | 9/2011 | Kocsis et al. | 707/694 |
| 8,613,048 | B2 * | 12/2013 | Braddy et al. | 726/4 |
| 2010/0205159 | A1 * | 8/2010 | Li et al. | 707/694 |
| 2013/0138808 | A1 * | 5/2013 | Biller | 709/224 |
| 2013/0185309 | A1 * | 7/2013 | Bhide et al. | 707/748 |
| 2013/0226879 | A1 * | 8/2013 | Talukder et al. | 707/690 |
| 2014/0081931 | A1 * | 3/2014 | Kung et al. | 707/694 |
| 2014/0143891 | A1 * | 5/2014 | Adams et al. | 726/28 |
| 2014/0250092 | A1 * | 9/2014 | Nakayama | 707/694 |

* cited by examiner

*Primary Examiner* — Hosain Alam
*Assistant Examiner* — Ahmed Abraham
(74) *Attorney, Agent, or Firm* — Lindauer Law, PLLC

(57) ABSTRACT

Techniques are described for enabling or suspending access to one or more datastores based on a determined quality of the stored data. The datastores may use relational or non-relational formats. User-specified rules may be applied to statistically determine the data quality of at least a portion of the data in the datastore. The rules may perform statistical tests on the data, such as determining whether an amount of stored data is within a margin of a historical average, whether a number of records storing particular data is within a historical average, and so forth. Based on the rules, a flag may be set to indicate the determined data quality. Access to the data may be based on the value of the flag.

20 Claims, 10 Drawing Sheets

STATISTICAL DATA QUALITY DETERMINATION FOR STORAGE SYSTEMS

BACKGROUND

Commercial enterprises and other organizations often store large amounts of data related to their operations. For example, an online business may store terabytes, petabytes, exabytes, or more of data describing products, sale transactions, customers, vendors, online activities of customers, and so forth. In some cases, data produced by one group, process, or individual in an organization may be consumed by various other groups, processes, or individuals in the organization. In such cases, corrupted, incomplete, or otherwise low quality data produced in one part of the organization may cause problems elsewhere in the organization.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

This disclosure describes implementations of systems, devices, methods, and computer-readable media for determining data quality of data stored in one or more datastores, and performing one or more actions based on the determined data quality. Implementations provide for the determination of data quality for one or more datastores, through the application of one or more data quality rules. For each datastore, a data quality flag may be set to indicate the data quality of the data stored in the datastore, based on the results of applying the data quality rules. Access to the data may be suspended or enabled based on a value of the data quality flag. In some cases, one or more issue notifications may be sent to notify users of the results of applying the data quality rules.

As used herein, a datastore describes a data storage system storing any type of data in any type of storage format, using any type of data storage technology. Implementations provide for data retrieval from datastores that include relational databases, such as databases that employ a relational database management system (RDBMS). Implementations also provide for data retrieval from datastores that employ a non-relational storage format, such as a "not only SQL" (NoSQL) database that does not adhere to a relational database model.

Figure 1:
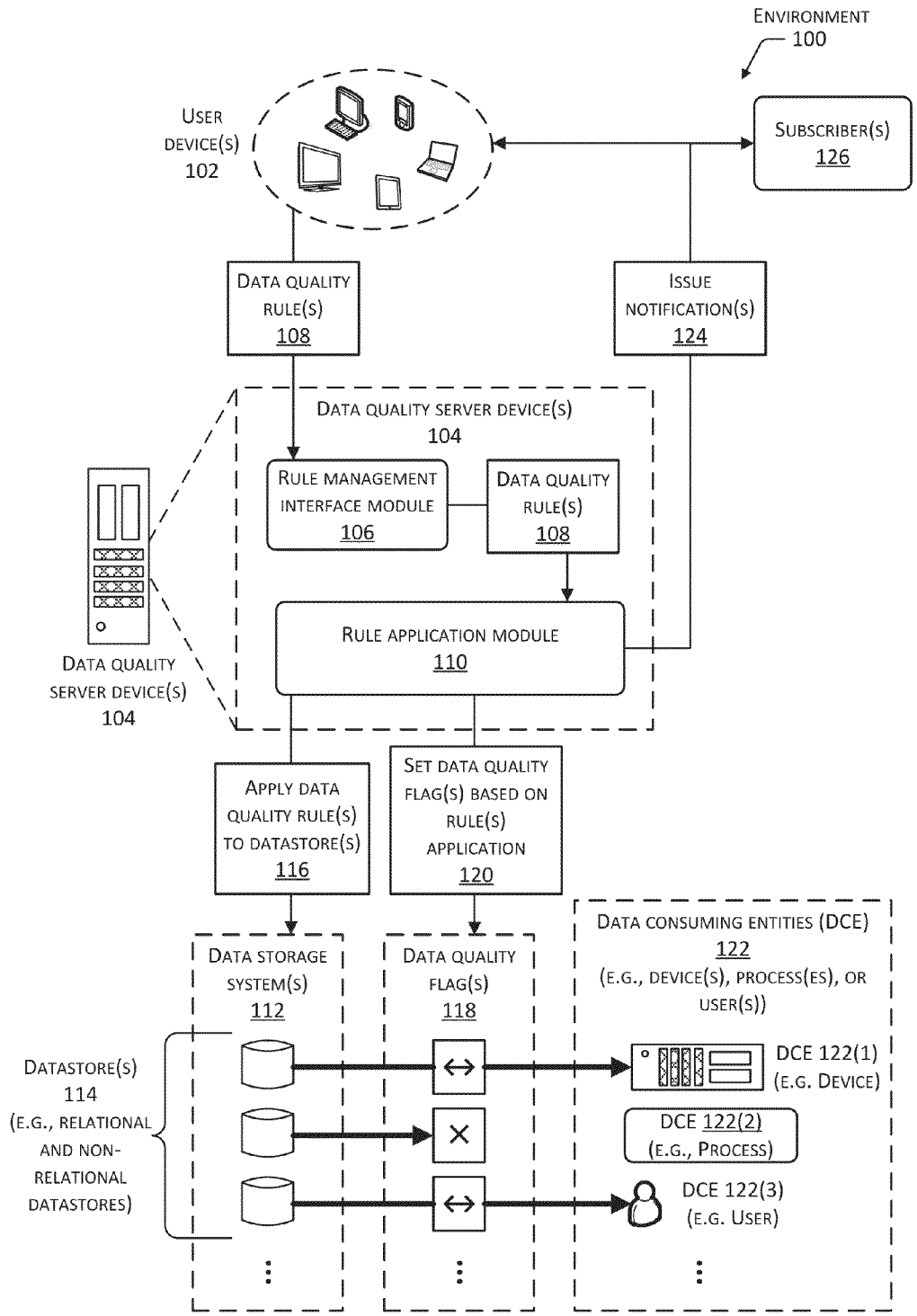
FIG. 1 depicts an environment for determining data quality of data stored in one or more datastores, including one or more user devices for providing one or more data quality rules, and one or more data quality server devices for applying the data quality rule(s) to evaluate a data quality of the data stored in the datastore(s).

FIG. 1 depicts an environment 100 in which implementations may operate to determine data quality of data stored in one or more datastores, as described herein. In some implementations, the environment 100 includes one or more user device(s) 102. In some cases, the user device(s) 102 may be employed by one or more data consumers to access, analyze, process, update, or otherwise use data stored in one or more datastores. The user device(s) 102 may also be employed by one or more data producers to generate, update, or store data stored in one or more datastores. Other users such as system administrators may also employ the user device(s) 102.

As used herein, data consumers and data producers may include individuals, processes, devices, or any groups of individuals, processes, or devices. In some cases, data consumers or data producers may be associated with a business or other type of organization. The data consumers may consume data for any purpose, such as to develop processes, systems, services, or products, to analyze or improve business or organizational operations, or for other purposes. The data producers may generate and store data associated with the operation of the business or organization, including data related to products, services, customers, billings, or other types of data. In some cases, one or more individuals, processes, or devices may operate as both data consumers and data producers.

In implementations, the user device(s) 102 may communicate with one or more data quality server device(s) 104. The user device(s) 102 and the data quality server device(s) 104 may include any type of computing device, including but not limited to a smartphone, a personal data assistant (PDA), a tablet computer, a wearable computer, an implanted computer, a mobile gaming device, an electronic book reader, an automotive computer, a desktop computer, a personal computer, a laptop computer, a thin client, a terminal, a game console, a smart appliance, a home entertainment device, a mainframe computer, a server computer, a network computer, and so forth. An example of the data quality server device(s) 104 is described further with reference to FIG. 2.

In some implementations, the data quality server device(s) 104 execute a rule management interface module 106. The rule management interface module 106 may provide a user interface to enable user(s) of the user device(s) 102 to define and provide one or more data quality rule(s) 108. The user(s) who define and provide the data quality rule(s) 108 may be described as author(s) of the data quality rule(s) 108.

The user interface may be a graphical user interface, command-line user interface, or any other type of user interface. In some cases, the rule management interface module 106 may provide the user interface through one or more web pages, and the user device(s) 102 may access the user interface by executing a web browser such as Mozilla® Firefox®, Microsoft® Internet Explorer®, Google® Chrome®, Apple® Safari®, Rockmelt®, and so forth. In such cases, the data quality rule(s) 108 or other information may be sent via a web browser-supported communications protocol, such as the Hypertext Transfer Protocol (HTTP), the HTTP Secure (HTTPS), the File Transfer Protocol (FTP), and so forth.

In some implementations, the communications between the user device(s) 102 and the data quality server device(s) 104, or between other devices in the environment 100, may be secure or encrypted. For example, the communications may be encrypted using any version of the Secure Sockets Layer (SSL) protocol or the Transport Layer Security (TLS) protocol.

The data quality rule(s) 108 may include one or more rules or sets of rules to be applied to determine data quality of data stored in one or more datastores. The data quality rule(s) 108 may be configurable by users such as data producers, data consumers, data storage administrators, or others. In some cases, the data quality rule(s) 108 may be expressed in a structured data format that includes descriptive metadata. For example, the data quality rule(s) 108 may be expressed using a version of the Extensible Markup Language (XML), or another markup language.

In some implementations, the data quality rule(s) 108 may include one or more conditions to be applied to data stored in one or more datastores. The conditions may include mathematical or statistical conditions on the data. For example, one of the data quality rule(s) 108 may include a mathematical condition to test whether a current amount of data stored in a particular table or other portion of a datastore is within a predetermined margin (e.g., 5%) of a historical average for the amount of data stored. In cases where the current amount of data is above or below the predetermined margin, the data quality rule 108 may fail. The data quality rule(s) 108 may include a timing parameter specifying one or more start times when the data quality rules(s) 108 are to be executed. The data quality rule(s) 108 may also include an identification of the datastore(s) to which the data quality rule(s) 108 are to be applied, and a sampling parameter specifying a sample amount of the stored data to be tested or evaluated during an application of the data quality rule(s) 108. The data quality rule(s) 108 are described further with reference to FIG. 3.

In some cases, the rule management interface module 106, or another module of the data quality server device(s) 104, may receive the data quality rule(s) 108 provided by a user and perform an analysis to determine whether the received data quality rule(s) 108 are identical or substantially similar to previously received rules. If so, the user may be prompted to subscribe to one or more of the previously received rules, and receive a notification of the results of subsequent applications of such rules.

In some implementations, the rule management interface module 106 may provide the data quality rule(s) 108 to a rule application module 110 executing on the data quality server device(s) 104. The rule application module 110 may communicate with one or more data storage systems 112 that each includes one or more datastores 114. The rule application module 110 may perform one or more operations to apply data quality rule(s) to datastores 116 to determine data quality of data stored in the datastore(s) 114. Operations of the rule application module 110 are described further herein, with reference to FIGS. 4-10.

The datastore(s) 114 in the data storage system(s) 112 may include any number of databases, data storage nodes, or other data storage devices. In some cases, the datastore(s) 114 may include one or more processors or computing devices to perform actions for data storage, retrieval, and modification. Alternatively, the datastore(s) 114 may be controlled by processors or computing devices not included in the data storage system(s) 112. The datastore(s) 114 may store any amount of structured or unstructured data. In some cases, the amount of data stored in the data storage system(s) 112 may be on the order of exabytes.

The datastore(s) 114 may include any number of relational datastores. As used herein, a relational datastore describes a datastore that employs a relational storage format including one or more formally described tables, each table including one or more columns associated with data attributes. In such cases, the datastore(s) 114 may be managed through RDBMS software. The datastore(s) 114 may include any number of relational databases, including but not limited to databases managed through any of the following: Oracle® and MySQL®, from Oracle Corporation of Redwood City, Calif.; DB2®, from International Business Machines (IBM) Corporation of Armonk, N.Y.; Linter®, from the RELEX Group of Voronezh, Russia; Microsoft Access® and Microsoft SQL Server®, from Microsoft Corporation of Redmond, Wash.; PostgreSQL®, from the PostgreSQL Global Development Group; and SQLite®, from D. Richard Hipp.

The datastore(s) 114 may also include any number of non-relational datastores. As used herein, a non-relational datastore describes a datastore that employs a non-relational data storage format and that may not comply with a relational database model. In some cases, non-relational datastores may employ a hierarchical database model, or a network database model. Non-relational datastores may also include key-value datastores, hash tables, flat files, associative arrays, other types of data structures, or unstructured data storage. In some cases, non-relational datastores may store metadata describing data attributes or other aspects of the stored data. Non-relational datastores may include any number of non-relational databases, including but not limited to databases managed through any of the following: FoxPro® database management system, from Microsoft Corporation of Redmond, Wash.; ParAccel® Analytic Database, from ParAccel, Incorporated of San Diego, Calif.; and Hadoop®, from the Apache Software Foundation.

In some cases, the datastore(s) 114 of the data storage system(s) 112 may store large amounts of data, on the order of petabytes, exa bytes, or greater. The datastores may be subject to a high frequency of updates, for example hundreds of millions of updates daily. In some implementations, the datastore(s) 114 in the data storage system(s) 112 may be owned by, operated by, controlled by, or otherwise associated with different individuals, groups of individuals, or organizations. For example, a datastore A may be associated with a particular group X within an organization, and a datastore B may be associated with a particular group Y within an organization, such that the data stored in datastores A and B originates from data producers associated with groups X and Y respectively.

Although the data storage system(s) 112 are depicted in FIG. 1 as including three datastores, implementations are not so limited. Implementations support any number of the data storage system(s) 112, each including any number of the datastore(s) 114. The datastore(s) 114 may include one or more relational datastores, one or more non-relational datastores, or both relational and non-relational datastores. Each of the datastore(s) 114 may support one or more native query languages for performing data read and write operations. For example, relational datastores may support a version of the Structured Query Language (SQL). As another example, non-relational datastores may support queries in the Hadoop Query Language (HQL), MapReduce, or other query languages.

In some implementations, the environment 100 may include one or more indicators of data quality, such as one or more data quality flags 118. The data quality flag(s) 118 or other indicia of data quality may be stored in computer memory as variables, data structures, or other portions of memory, storing any amount or type of data. In some cases, each of the datastore(s) 114 may be associated with one or more of the data quality flag(s) 118, and a value stored in the data quality flag(s) 118 may indicate a quality of the data stored in the associated datastore(s) 114. In some implementations, each of the data quality flag(s) 118 may be stored in the memory of an associated datastore 114. Alternatively, the data quality flag(s) 118 may be stored in memory on the data quality server device(s) 104 or on one or more other devices. In some implementations, the data quality flags 118 may be arranged in memory as an array of key-value pairs. In such implementations, each key-value pair may include a key that identifies a datastore 114 and an associated value that is the data quality flag 118 indicating a data quality for the datastore 114.

In some implementations, the data quality flag(s) 118 may each store one or more binary values indicating a positive data quality or a negative data quality of one or more associated datastores 114. Although examples described herein provide for a binary (e.g., positive or negative) data quality, implementations support any number of values to indicate any level of granularity for the data quality of data stored in the datastore(s) 114.

As described further herein, the rule application module 110 applies the data quality rule(s) 108 to test, evaluate, or otherwise determine the data quality of data stored in the datastore(s) 114. The rule application module 110 may also perform one or more operations 120 to set a value of the data quality flag(s) 118 based on the determined data quality. In some implementations, the value of each data quality flag 118 determines whether one or more data consuming entities (DCE) 122 may access a datastore 114 that is associated with the data quality flag 118. The one or more data consuming entities 122 may include one or more devices, one or more processes, or one or more users that may request access to the stored data.

In some implementations, if a data quality flag 118 is set to a value that indicates a negative data quality, access to an associated datastore 114 may be suspended such that the data consuming entities 122 may be prevented from accessing the stored data. Alternatively, if a data quality flag 118 is set to a value that indicates a positive data quality, access to an associated datastore 114 may be enabled. The data quality flag(s) 118 may also prevent or enable access to the datastore(s) 114 by data producers, and may control whether data producers are permitted to write or update data in the datastore(s) 114. By setting the data quality flag(s) 118, the data quality server device(s) 104 may control access to the datastore(s) 114 based on the determined data quality of the datastore(s) 114.

In addition to setting values of the data quality flag(s) 118, the rule application module 110 may perform other actions based on the results of applying the data quality rules 108. In some implementations, the rule application module 110 may send one or more issue notifications 124 to inform one or more users of the results of applying the data quality rules 108. The issue notification(s) 124 may indicate a positive data quality or a negative data quality for the datastore(s) 114. Implementations support issue notification(s) 124 sent through any mode of communication, including, but not limited to, emails, text messages, voice messages, faxes, instant messages, or issue tickets entered into an issue tracking or bug tracking system.

In some cases, an issue notification 124 describing the result(s) of applying a particular data quality rule 108 may be sent to one or more individuals identified as owners of, or authors of, the data quality rule 108. Such individuals may be data consumers, data producers, or others, and the issue notification(s) 124 may be sent to the user device(s) 102 associated with such individuals. Further, one or more issue notification(s) 124 may be sent to subscribers 126. The subscribers 126 may include users, groups of users, processes, devices, e-mail lists, or other entities who have subscribed to receive notifications regarding the results of applying one or more data quality rules 108. The subscriber(s) 126 may also include owners or authors of the data quality rule(s) 108. In some implementations, the rule application module 110 may create or update one or more log files to store information regarding the execution of the data quality rule(s) 108, the log file(s) being accessible by a system administrator or other user(s).

In some implementations, the various devices of the environment 100 may communicate with one another using one or more networks. Such networks may include public networks such as the Internet, private networks such as an institutional or personal intranet, or some combination of private and public networks. The networks may include any type of wired or wireless network, including but not limited to local area networks (LANs), wide area networks (WANs), wireless WANs (WWANs), wireless LANs (WLANs), and mobile communications networks (e.g. 3G, 4G, and so forth).

Figure 2:
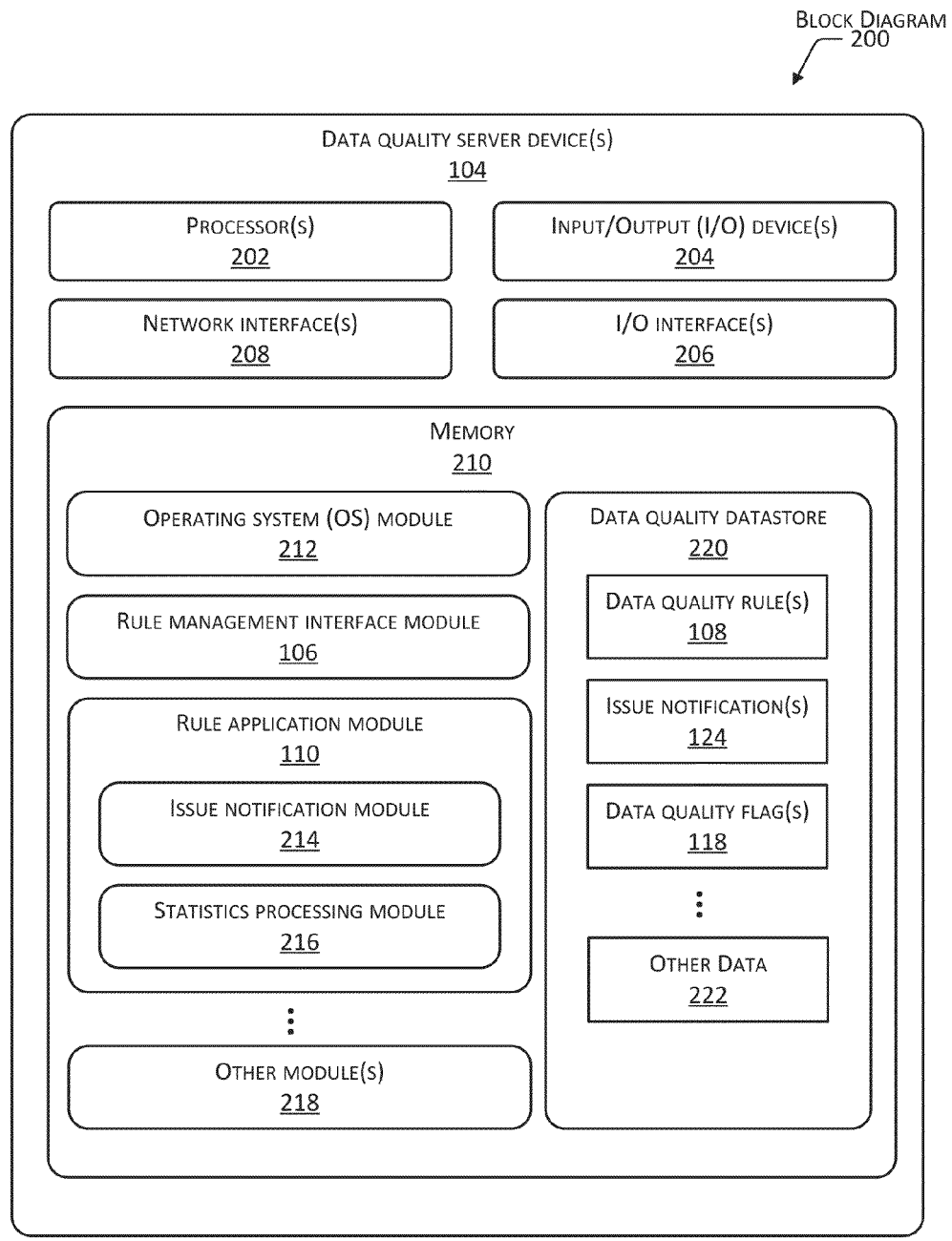
FIG. 2 depicts a block diagram of an example data quality server device configured to perform operations for determining data quality through the application of the data quality rule(s).

FIG. 2 depicts a block diagram 200, depicting an example system architecture for the data quality server device(s) 104 shown in FIG. 1. As shown in block diagram 200, the data quality server device(s) 104 may include one or more processors 202 configured to execute one or more stored instructions. The processor(s) 202 may comprise one or more cores.

The data quality server device(s) 104 may include one or more input/output (I/O) devices 204. The I/O device(s) 204 may include user input devices such as a keyboard, a mouse, a pen, a game controller, a voice input device, a touch input device, a gestural input device, a haptic input device, or other devices. The I/O device(s) 204 may also include output devices such as a display, a printer, audio speakers, haptic output devices, and so forth. The I/O device(s) 204 may be physically incorporated with the data quality server device(s) 104, or may be externally placed.

The data quality server device(s) 104 may include one or more I/O interfaces 206 to enable components or modules of the data quality server device(s) 104 to control, interface with, or otherwise communicate with the I/O device(s) 204. The I/O interface(s) 206 may enable information to be transferred in to the data quality server device(s) 104, out of the data quality server device(s) 104, or between components of the data quality server device(s) 104. Information may be transferred through serial communication, parallel communication, or other types of communication. For example, the I/O interface(s) 206 may comply with the RS-232 standard for serial ports, or with the Institute of Electrical and Electronics Engineers (IEEE) 1284 standard for parallel ports. As another example, the I/O interface(s) 206 may be configured to provide a Universal Serial Bus (USB) connection. The data quality server device(s) 104 may also include one or more busses or other internal communications hardware or software that allow for the transfer of data between the various modules and components of the data quality server device(s) 104.

The data quality server device(s) 104 may include one or more network interfaces 208 to enable communications between the data quality server device(s) 104 and other networked devices, such as the user device(s) 102 or the data storage system(s) 112. The network interface(s) 208 may include one or more network interface controllers (NICs) or other types of transceiver devices configured to send and receive communications over a network.

The data quality server device(s) 104 may include one or more memories, described herein as memory 210. The memory 210 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 210 provides storage of computer-readable instructions, data structures, program modules, and other data for the operation of the data quality server device(s) 104.

The memory 210 may include an operating system (OS) module 212. The OS module 212 is configured to manage hardware resources such as the I/O device(s) 204, the I/O interface(s) 206, and the network interface(s) 208, and to provide various services to applications, processes, or modules executing on the processor(s) 202. The OS module 212 may include one or more of the following: any version of the Linux® operating system originally released by Linus Torvalds; any version of iOS® from Apple Corp. of Cupertino, Calif.; any version of Windows® or Windows Mobile® from Microsoft Corp. of Redmond, Wash.; any version of Android® from Google, Corp. of Mountain View, Calif. and its derivatives from various sources; any version of Palm OS® from Palm Computing, Inc. of Sunnyvale, Calif. and its derivatives from various sources; any version of BlackBerry OS® from Research In Motion Ltd. of Waterloo, Ontario, Canada; any version of VxWorks® from Wind River Systems of Alameda, Calif.; or other operating systems.

In some implementations, the memory 210 includes the rule management interface module 106. The rule management interface module 106 may provide one or more user interfaces accessible to the user device(s) 102, enabling data consumers, data producers, or other users to provide the data quality rule(s) 108 or other information. In cases where the user interface(s) are provided through one or more web pages, the rule management interface module 106 may include a web server such as the Apache Web Server®, from the Apache Software Foundation, Internet Information Services® (IIS), from the Microsoft Corporation of Redmond, Wash., or another web server.

The memory 210 may also include the rule application module 110. The rule application module 110 may perform operations to apply the data quality rule(s) 108 to determine data quality of the data stored in the datastore(s) 114. The rule application module 110 may also perform one or more actions based on the determined data quality, such as set the data quality flag(s) 118 based on the results of applying the data quality rule(s) 108, and send the issue notification(s) 124 to inform users of the results. In some implementations, the rule application module 110 includes an issue notification module 214 to generate and send the issue notification(s) 124. The rule application module 110 may also include a statistics processing module 216 to perform one or more mathematical or statistical operations to determine whether the data quality rule(s) 108 are satisfied, to generate a sample data set for rules application, or for other purposes. Operations of the rule application module 110 are described further with reference to FIGS. 4-10.

The memory 210 may also include one or more other modules 218, such as a user authentication module, an access control module, a security or cryptography module, and so forth.

The memory 210 may also include a data quality datastore 220 to store information for operations of the data quality server device(s) 104. The data quality datastore 220 may comprise a database, array, structured list, tree, or other data structure, and may be a relational or a non-relational datastore. The data quality datastore 220 may store one or more of the data quality rule(s) 108, the issue notification(s) 124, and the data quality flag(s) 118. The data quality datastore 220 may also store other data 222, such as user account information, user authentication information, and so forth. In some implementations, at least a portion of the information stored in the data quality datastore 220 may be stored externally to the data quality server device(s) 104, on other devices that are accessible to the data quality server device(s) 104 via the I/O interface(s) 206 or the network interface(s) 208.

Figure 3:
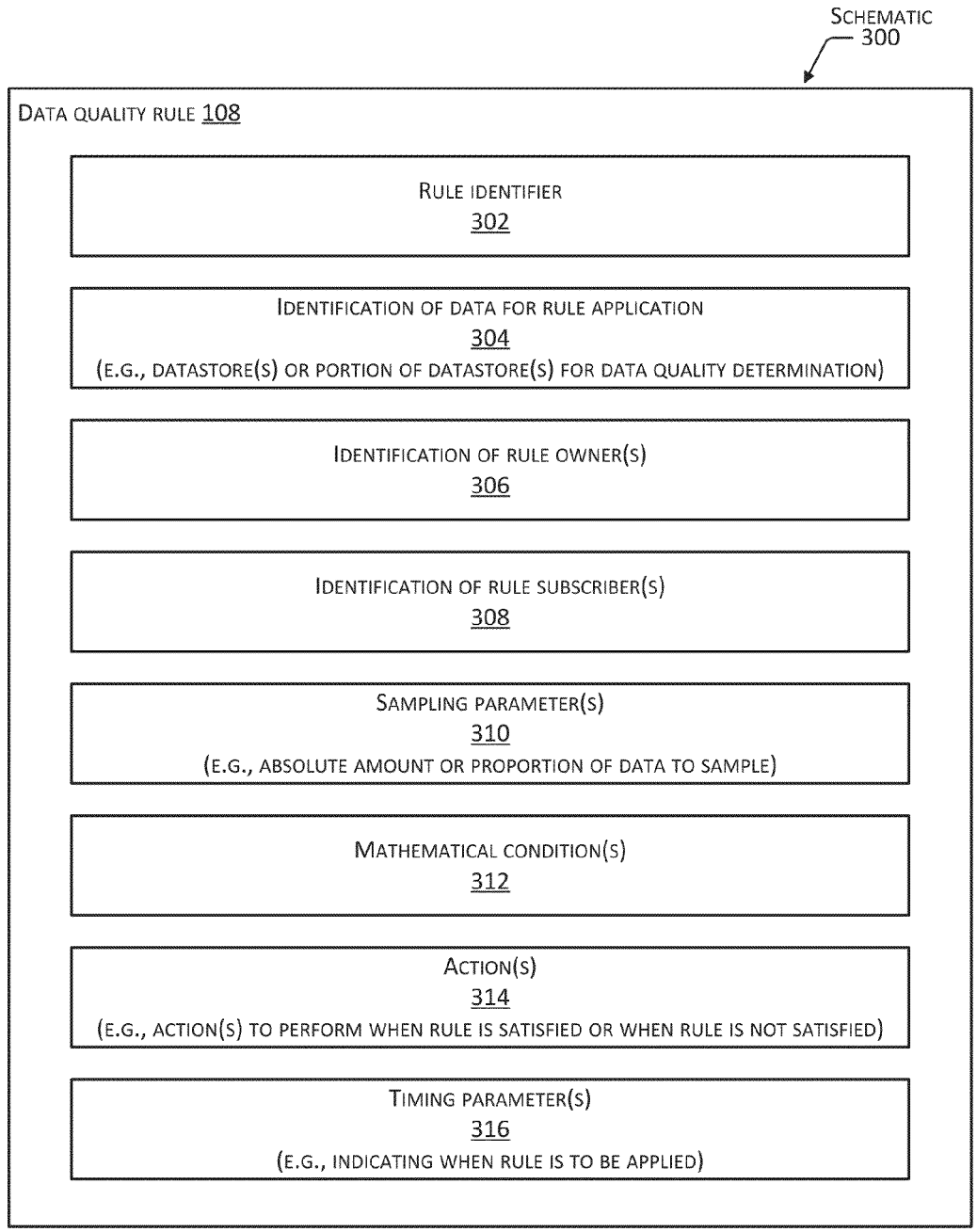
FIG. 3 depicts a schematic of an example data structure for the data quality rule(s).

FIG. 3 depicts a schematic 300 of an example data structure for the data quality rule(s) 108. The data quality rule(s) 108 may be expressed in any type of data structure, or in unstructured data. In some implementations, the data quality rule(s) 108 are expressed in a markup language such as XML. Implementations may employ any number of data quality rules 108 to determine data quality.

In some implementations, each of the data quality rule(s) 108 includes a rule identifier 302. The rule identifier 302 may include textual data, numeric data, or other data that identifies the data quality rule 108. In some cases, the rule identifier 302 may uniquely identify the data quality rule 108. The rule identifier 302 may also include a textual description of the data quality rule 108 in a human-readable format. For example, the rule identifier 302 may describe the condition(s) for the data quality rule 108, the datastore to which the data quality rule 108 is to be applied, the times when the data quality rule 108 is to be applied, and so forth.

The data quality rule 108 may also include an identification of data for rule application 304. The identification 304 may include an identifier for one or more datastores 114 for which data quality is to be determined. The identification 304 may also include one or more segments, subsets, tables, data attributes, or other portions of the one or more datastores 114 for which data quality is to be determined. For example, the identification 304 may indicate that data quality is to be determined for data stored in TableX, TableY, and TableZ of datastore A. As another example, the identification 304 may indicate that data quality is to be determined for the data that was stored in datastore B during a particular range of dates or times.

The data quality rule 108 may include an identification 306 that identifies one or more rule owners. The identification 306 may include a username, email address, alias, given name, identification number, telephone number, or other identifying information for one or more data consumers, data producers, or other users who are owners of the data quality rule 108. The owners may include one or more users who authored, defined, or created the data quality rule 108, and who may receive an issue notification 124 describing the results of applying the data quality rule 108.

In some cases, the data quality rule 108 may also include an identification 308 that identifies the one or more subscribers 126. The subscribers 126 may include one or more users, processes, devices, or other entities who have an interest in the results of the application of data quality rule 108 even though they may not have authored, defined, or created the data quality rule 108. Such users may also receive an issue notification 124 describing the results of applying the data quality rule 108. The user(s) identified in one or both of the identification 306 and the identification 308 may receive notice of a positive or negative data quality determination for data in one or more datastores 114.

Some implementations provide for the generation of a sample data set that is at least a portion of the data stored in a datastore 114. The data quality rule(s) 108 may be applied to the sample data set to determine a data quality of data stored in the datastore 114. The data quality rule 108 may include one or more sampling parameters 310, indicating a sample amount of data to include in the sample data set.

In some cases, the sampling parameter(s) 310 may indicate a relative amount of data for rule application, such as a proportion or percentage of the data identified in identification 304. For example, the sampling parameter(s) 310 may indicate that 1%, 5%, 10%, or another percentage of the stored data is to be retrieved to generate a sample data set. Alternatively, the sampling parameter(s) 310 may indicate an absolute amount of data (e.g., 1 gigabyte) to include in the sample data set. In some cases, the sampling parameter(s) 310 may indicate a sample amount based on a time period. For example, the sampling parameter(s) 310 may indicate that the sample data set is to include a portion of the stored data that was written to storage on a particular day, during a particular week, or during some other time period. In some cases, the sample data set may include substantially all of the data stored in a datastore 114.

The data quality rule 108 may include one or more mathematical conditions 312. Each of the mathematical condition(s) 312 may indicate a condition to be met for the data quality rule 108 to be satisfied. In some cases, a data quality rule 108 is satisfied if all the mathematical condition(s) 312 are satisfied. Alternatively, a data quality rule 108 may be satisfied if one or more mathematical conditions 312 are satisfied. Implementations support various types of the mathematical condition(s) 312, and each mathematical condition 312 may test or evaluate the sample data set. In some implementations, a mathematical condition 312 is satisfied if it evaluates to true.

The mathematical condition(s) 312 may include a condition to check whether a current size of the sample data set is within a predetermined margin of a historical average size of the sample data set. For example, if a current size of the sample data set is not within 10% of the historical average size of the sample data set, the condition may not be met and the data quality rule 108 may not be satisfied. Mathematically, this condition may be expressed as in Formula 1 below.

$$-0.1 < (S_{current} - S_{average})/S_{average} < 0.1 \quad \text{(Formula 1)}$$

In Formula 1, $S_{current}$ corresponds to a current size of the sample data set, and $S_{average}$ corresponds to a historical average size of the sample data set.

As used herein, an average value may refer to any mathematical formulation that provides a statistical measure of a central tendency for a distribution. Accordingly, an average may include an arithmetic mean, a median, a mode, and so forth. In some cases, the mathematical condition(s) 312 may also include a condition to check whether a current size of the sample data set is within a predetermined margin of a value that is halfway between a maximum and a minimum historical size of the sample data set. For example, if a current size of the sample data set is not within 5% of such a value halfway between maximum and minimum, the condition may not be met. Mathematically, this condition may be expressed as in Formula 2 below.

$$0.95 < (S_{max} + S_{min})/2 \times S_{current} < 1.05 \quad \text{(Formula 2)}$$

In Formula 2, $S_{current}$ corresponds to a current size of the sample data set, $S_{max}$ corresponds to a historical maximum size of the sample data set, and $S_{min}$ corresponds to a historical minimum size of the sample data set. The maximum and minimum may be determined based on analysis of a particular time period worth of data (e.g., a month or year worth of data). The mathematical condition(s) 312 may also include conditions on other statistical measures for the size of the sample data set, including but not limited to, its maximum, minimum, range, or standard deviation. Moreover, implementations may employ various statistical models or algorithms to evaluate whether the mathematical conditions(s) 312 are satisfied, including, but not limited to, confidence intervals, correlation analyses, analysis of variance (ANOVA) techniques, regression analyses, and so forth.

The mathematical condition(s) 312 may include a condition to check whether a change in the size of the sample data set is within a predetermined margin of a historical variation in the size of the sample data set. For example, if the size of the sample data set has varied over a period of time (e.g., a day), and the amount of the variation (e.g., the delta) is more than 10% of a historical average variation of the sample data set, the condition may not be met. Mathematically, such a condition may be expressed as in Formula 3 below.

$$-0.1 < (\Delta S_{current} - \Delta S_{average})/\Delta S_{average} < 0.1 \quad \text{(Formula 3)}$$

In Formula 3, $\Delta S_{current}$ corresponds to a current variation in the size of the sample data set over a period of time (e.g., a day), and $\Delta S_{average}$ corresponds to a historical average change in the size of the sample data set over similar periods of time.

As used herein, a data attribute may correspond to a column in a table (e.g., in a relational datastore) or may correspond to a searchable data element in a non-relational datastore. In some implementations, the mathematical condition(s) 312 may include a condition to check whether a current count of rows or records for which a particular data attribute stores a particular value is within a predetermined margin of a historical average count of such rows or records. For example, if a current count of rows or records for which a data attribute "Sale Price" stores a particular value 0.00 is outside a predetermined margin (e.g., 5%) of a historical average count of such rows or records, the condition may not be met. Mathematically, this condition may be expressed as in Formula 4 below.

$$-0.05 < (C_{current} - C_{average})/C_{average} < 0.05 \quad \text{(Formula 4)}$$

In Formula 4, $C_{current}$ corresponds to a current count of rows or records for which a data attribute stores a particular value in the sample data set, and $C_{average}$ corresponds to a historical average count of such rows or records.

The above examples of mathematical condition(s) 312 are not limiting or exhaustive, and implementations may support other types of mathematical condition(s) 312. Although the examples herein describe mathematical conditions 312 to test a sample data set that is a portion of the data stored in a datastore 114, implementations also support the application of the mathematical condition(s) 312 to a data set that includes substantially all of the data stored in a datastore 114. Moreover, Formulae 1-4 provide examples of the described mathematic condition(s) 312, and implementations may support calculations or algorithms other than these examples.

Moreover, the historical average size or historical average count described above may be evaluated based on previous measurements of the size or count over any period of time, such as a previous week, a previous month, and so forth. In some cases, the time period may be based on a particular event, holiday, season, and so forth. For example, a particular sample data set may include clickstream data for an e-commerce web site, and the amount of stored clickstream data may be expected to increase over a busy shopping season. In such cases, the time period for comparison may be a previous shopping season. Alternatively, the mathematical condition(s) 312 may incorporate one or more adjustments to account for the expected increase in the amount of stored data. By comparing a current size or current count against historical data, implementations may operate to identify deviations of a current state of the datastore 114 from a normative state, and infer potential problems based on the identified deviations.

In some implementations, the data quality rule 108 may include a description of one or more actions 314 to perform if the data quality rule 108 is not satisfied. Such action(s) 314 may include setting a data quality flag 118 to limit or suspend access to the corresponding datastore 114. The action(s) 314 may also include sending one or more issue notifications 124 to data consumers, data producers, or other users. The issue notification(s) 124 may be sent via any mode of communication and in any format, including, but not limited to, emails, text messages, voice messages, faxes, and so forth. In some cases, the issue notification(s) 124 may include generating an issue ticket or bug report to be automatically entered into an issue tracking or bug tracking system. The issue notification(s) 124 may also be communicated through a user interface provided by the rule management interface module 106.

The issue notification(s) 124 may include a description of the data quality rule 108 that was not satisfied (e.g., that failed), a description or identification of the datastore(s) 114 to which the data quality rule 108 was applied, a description of the sample data set to which the data quality rule was applied (e.g., the sample amount of data, which tables, rows, or data attributes were tested, and so forth), the identification of the rule owner(s) 306, a time when the data quality rule 108 was applied, and so forth.

The data quality rule 108 may include one or more timing parameter(s) 316 indicating one or more start times when the data quality rule 108 is to be applied. For example, a data quality rule 108 may be scheduled to be applied periodically, such as daily, weekly, or monthly, at a particular time of day, on a particular day of the week, or on a particular day of the month, and so forth. As another example, the data quality rule 108 may be scheduled to be applied one or more times on particular dates and at particular times.

In some cases, the timing parameter(s) 316 may be specified to accommodate expected variations over a period of time. For example, a particular dataset may vary in size or vary in the amount of data added over a period of time such as a day, and such variations may exhibit an expected pattern (e.g., more data added during the day, and less data added during the night, and so forth). In such cases, the timing parameter(s) 316 may indicate that the data quality rule 108 is to be executed with a periodicity such that the expected variations do not lead to an inference of low data quality.

Figure 4:
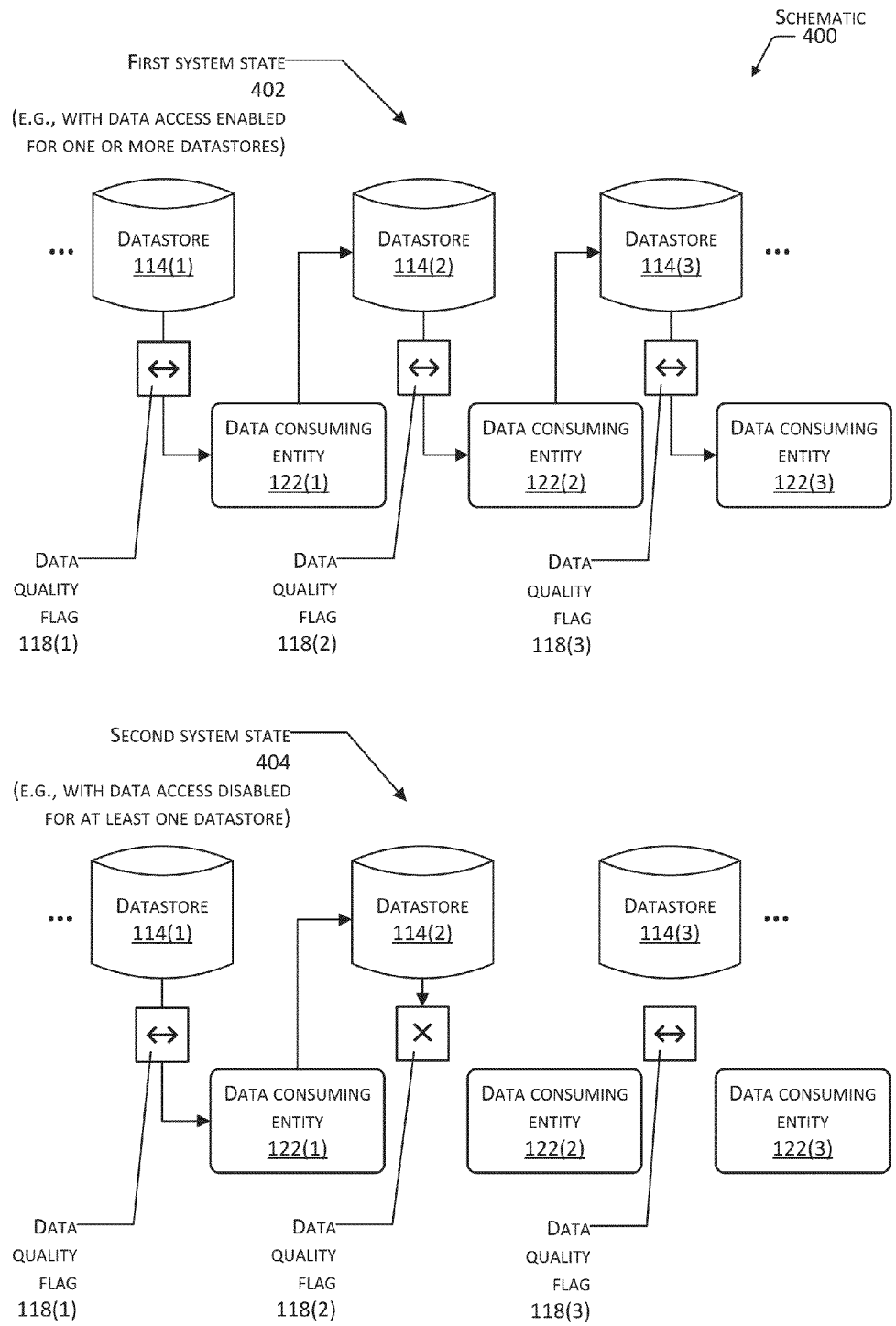
FIG. 4 depicts the enabling and disabling of access to a plurality of datastores through the use of one or more flags that indicate data quality of the datastore(s), in a scenario where there is a linear data flow between the datastores.

FIG. 4 depicts a schematic 400 showing the enabling and disabling of access to a plurality of datastores 114 through the use of one or more data quality flags 118 that each indicate a data quality of a datastore 114, in a scenario where there is a linear data flow between at least some of the datastores 114.

In the scenario illustrated in FIG. 4, a first data set from a first datastore 114(1) may be read by a first data consuming entity 122(1), which employs the first data set to generate a second data set that may be written to a second datastore 114(2). A second data consuming entity 122(2) may read the second data set from the second datastore 114(2), and generate a third data set which is written to a third datastore 114(3). The third data set may then be read by a third data consuming entity 122(3), and so forth. In this way, one or more of the data consuming entities 122 may also be a data producing entity. Each entity may read data from the datastore(s) 114 and may re-write that data, or write newly generated data, to the datastore(s) 114. The top diagram of FIG. 4 depicts a first system state 402, in which data access is enabled for the one or more datastores 114.

Because downstream data consumers and producers may be reading, writing, and generally using data that is derived from or in some way dependent on upstream data, low data quality of the upstream data may cause a cascade of data quality issues or system problems for the downstream data consumers and producers. The bottom diagram of FIG. 4 depicts a second system state 404, in which data access has been disabled for at least one of the datastores 114. In some implementations, access to data stored on a datastore 114 may be permitted, suspended, or limited based on the value stored in the corresponding data quality flag 118. In this example, a negative data quality has been determined for the datastore 114(2), and a corresponding data quality flag 118(2) has been set to a value indicating the negative data quality. In this example, write operations are enabled to write data to the datastore 114(2) by the data consuming entity 122(1), but the data consuming entity 122(2) is blocked from reading data stored in the datastore 114(2). In some implementations, writes or updates to data stored in a datastore 114 may also be suspended based on a value of the corresponding data quality flag 118.

Implementations support various techniques by which data access is suspended or blocked based on the value of a data quality flag 118. In some cases, the data consuming entities 122 may check a value of the data quality flag 118 before attempting to access data stored on a corresponding datastore 114, and may determine to not access the data if the data quality flag 118 indicates a negative data quality. Alternatively, a database management system or another software component associated with the datastore 114 may check a value of the data quality flag 118 in response to receiving an access request from a data consuming entity 122, and may block such access if the data quality flag 118 indicates a negative data quality.

In some cases, access to all of the data stored on a datastore 114 may be suspended or blocked if a corresponding data quality flag 118 indicates a negative data quality. Alternatively, access to a portion of the stored data may be suspended. For example, access to data associated with a particular region (e.g., North America, Europe, Asia, and so forth) may be suspended, but access to other data may be permitted. As another example, access to data associated with a particular table, data attribute, or time period, or access to rows or records that store particular data (e.g., data associated with a particular merchant or product) may be suspended, but access to other data may be permitted. In this way, implementations may control data access with any degree of granularity or specificity.

Figure 5:
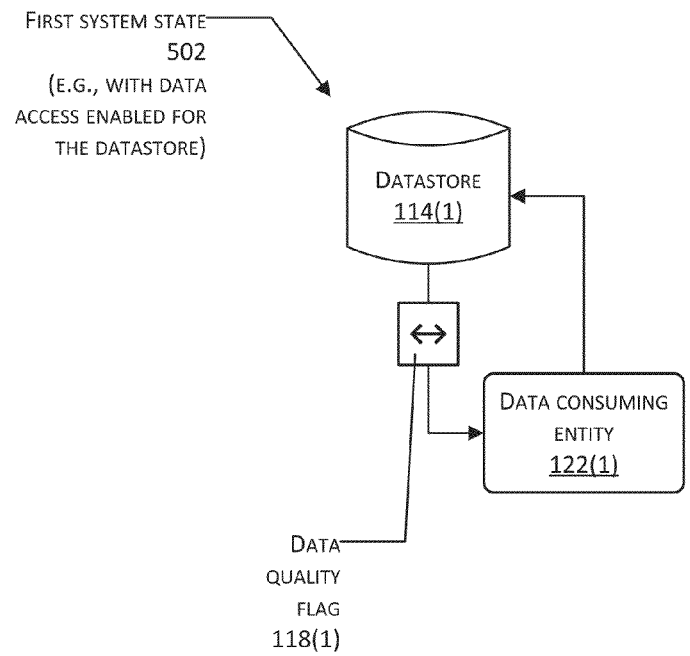
FIG. 5 depicts the enabling and disabling of access to a datastore through the use of a flag that indicates data quality of the datastore, in a scenario where there is a cyclic data flow to and from the datastore.
Figure 5:
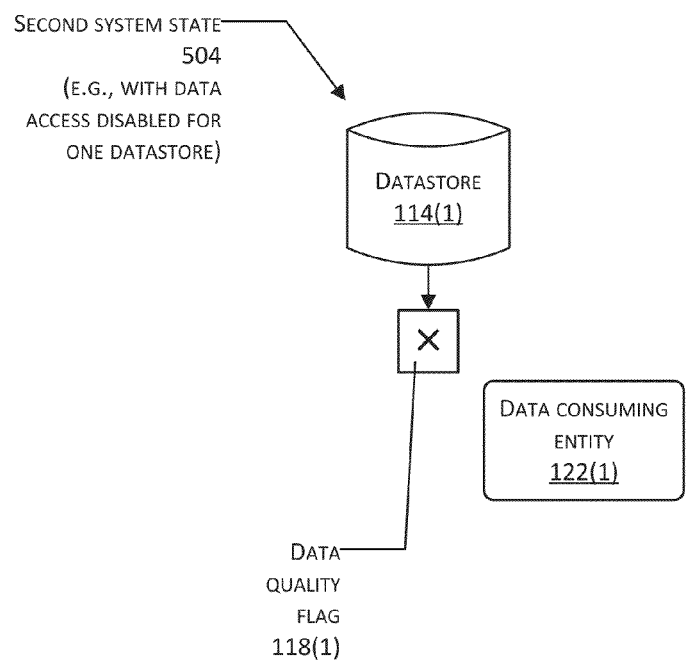

FIG. 5 depicts a schematic 500 showing the enabling and disabling of access to a datastore 114(1) through the use of a data quality flag 118(1) that indicates a data quality of the datastore 114(1). FIG. 5 illustrates a scenario in which there is a cyclic data flow to and from a datastore 114(1). In this scenario, a particular data consuming entity 122 may read data from the datastore 114(1). The data consuming entity 122 may then write at least a portion of that data, or write newly generated data, to the same datastore 114(1).

The top diagram of FIG. 5 depicts a first system state 502, in which data access is enabled for the datastore 114(1). The bottom diagram of FIG. 5 depicts a second system state 504 in which data access to the datastore 114(1) has been disabled through the setting of the associated data quality flag 118(1), based on a determination of a negative data quality for the datastore 114(1). In this case, both reads and writes to the datastore 114(1) have been suspended. Such a suspension may prevent further data corruption or system problems that may occur if the data consuming entity 122(1) were allowed to continue accessing the low quality data, and allowed to generate and write new data based on the low quality data.

In some cases, the data quality flag(s) 118 may be preemptively set to a particular value based on detected or scheduled outages in one or more data producing entities. For example, if it is detected that a particular server is experiencing downtime, and that particular server is a data producing entity that stores data in a datastore 114, then a corresponding data quality flag 118 may be set to suspend access to the datastore 114 during the downtime. In such cases, suspending access to the datastore 114 may prevent data consuming entities 122 from reading corrupt or incomplete data from the datastore 114. In some cases, data producing servers or other devices may be periodically polled by the data quality server device(s) 104 to determine their status or activity. If such devices are nonresponsive to the polling, access may be suspended to one or more datastore(s) 114 that may store data that would otherwise be produced by the inactive devices.

Figure 6:
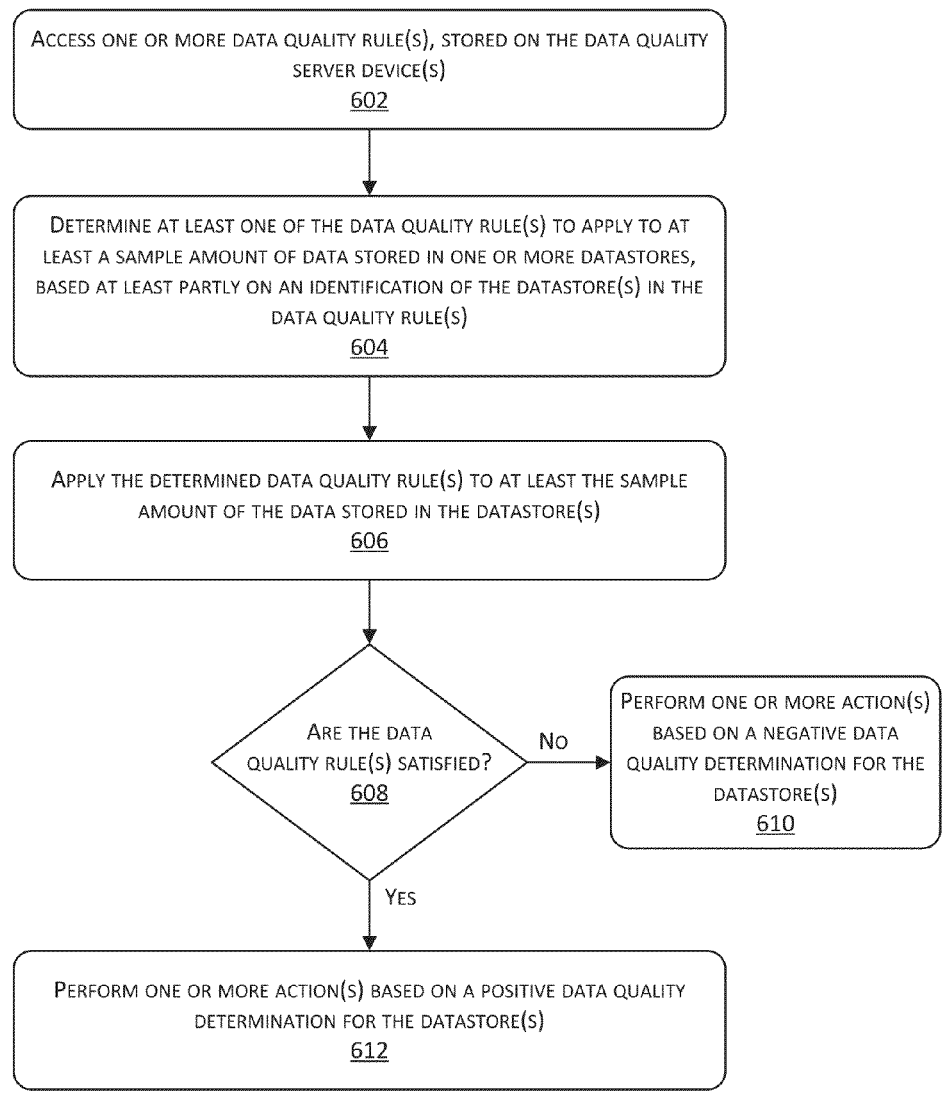
FIG. 6 depicts a flow diagram of a process for applying one or more data quality rules to data stored in one or more datastores, and performing one or more actions based on the results of the application of the data quality rule(s).

FIG. 6 depicts a flow diagram 600 of a process for applying one or more data quality rules 108 to data stored in one or more datastores 114, and performing one or more actions 314 based on the results of the application of the data quality rule(s) 108. Operations included in the process may be performed on one or more of the user device(s) 102, the data quality server device(s) 104, or the data storage system(s) 112. Operations performed on the data quality server device(s) 104 may be performed by the rule management interface module 106, the rule application module 110, or other modules.

At 602, the process may access one or more data quality rules 108 stored in memory. In some implementations, the data quality rule(s) 108 may be stored in memory 210 on the data quality server device(s) 104. Alternatively, at least a portion of the data quality rule(s) 108 may be stored externally to the data quality server device(s) 104.

At 604, a determination is made to identify at least one of the data quality rule(s) 108 to apply to data stored in one or more datastore(s) 114. In some implementations, one or more default data quality rule(s) 108 may be selected. The determination may also be based on information included in the data quality rule(s) 108. For example, in cases where data quality is to be tested for a particular datastore 114, those data quality rule(s) 108 may be selected for which the identification 304 identifies the datastore 114.

At 606, the determined data quality rule(s) 108 are applied to data stored in the datastore(s) 114, to determine the data quality of the datastore(s) 114. Application of the data quality rule(s) 108 is described further with reference to FIG. 7. In some cases, the data quality rule(s) 108 may be applied to a sample data set that includes a portion of the data stored in the datastore(s) 114. Determination of the sample data set is described further with reference to FIG. 8.

At 608, a determination is made whether the data quality rule(s) 108 are satisfied. If not, then at 610 one or more actions 314 may be performed based on a negative data quality determination for the datastore(s) 114. If the determination at 608 is positive, then at 612 one or more actions 314 may be performed based on a positive data quality determination for the datastore(s) 114. The action(s) 314 are described further with reference to FIGS. 9 and 10.

Figure 7:
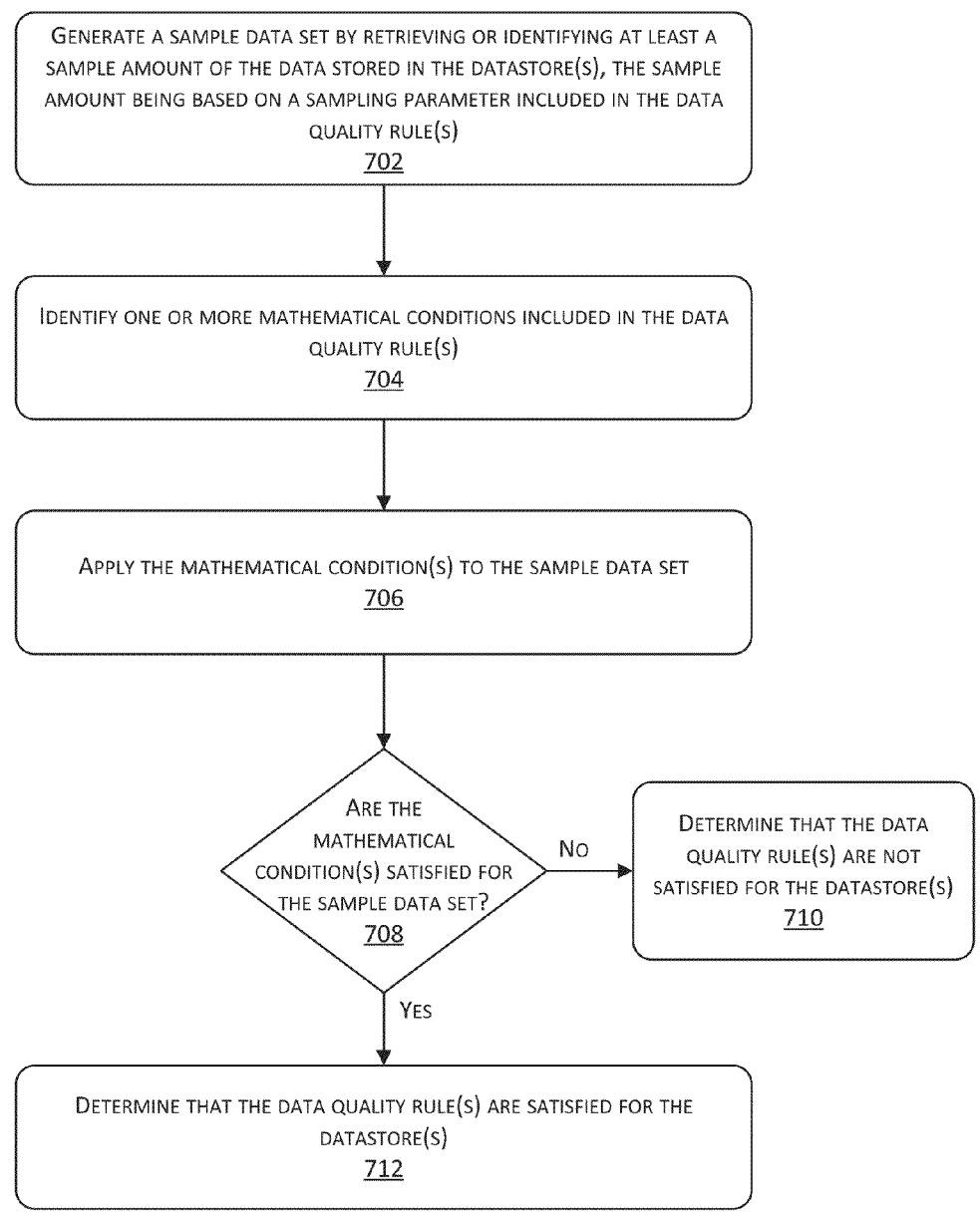
FIG. 7 depicts a flow diagram of a process for applying one or more data quality rules to data stored in the datastores(s), including generating a sample data set and applying one or more mathematical conditions to the sample data set to determine whether the data quality rule(s) are satisfied.

FIG. 7 depicts a flow diagram 700 of a process for applying one or more data quality rules 108 to data stored in the datastore(s) 114. This process may include generating a sample data set and applying one or more mathematical conditions 312 to the sample data set to determine whether the data quality rule(s) 108 are satisfied. Operations included in the process may be performed on one or more of the user device(s) 102, the data quality server device(s) 104, or the data storage system(s) 112. Operations performed on the data quality server device(s) 104 may be performed by the rule management interface module 106, the rule application module 110, or other modules.

At 702, a sample data set is generated by retrieving or identifying at least a sample amount of data stored in the datastore(s) 114 to be tested. In some implementations, the sample data set may be identified and retrieved from the datastore(s) 114 through a get operation or other type of data retrieval operation. Alternatively, the sample data set may be identified as a portion of the stored data and analyzed in place through one or more read or scan operations. In some cases, the sample amount may be based on the sampling parameter(s) 310 included in the data quality rule(s) 108 to be applied, as described above. Determination of the sampling data set is described further with reference to FIG. 8.

In some implementations, applying a data quality rule 108 may include applying the one or more mathematical condition(s) 312 described in the data quality rule 108. At 704, one or more mathematical conditions 312 may be identified, the mathematical condition(s) 312 being included in the data quality rule 108. At 706, the mathematical condition(s) 312 may be applied to the sample data set, as described above with reference to FIG. 3.

At 708, a determination is made whether the mathematical condition(s) 312 are satisfied for the sample data set. If not, then at 710 a determination may be made that the data quality rule(s) 108 are not satisfied for the datastore(s) 114. If so, then at 712 a determination may be made that the data quality rule(s) are satisfied for the datastore(s) 114. One or more actions 314 may then be performed based on the determination at 710 or 712, as described further with reference to FIGS. 9 and 10. In some implementations, a data quality rule 108 is satisfied if all of its mathematical condition(s) 312 are satisfied. Alternatively, a data quality rule 108 may be satisfied if at least some of its mathematical condition(s) 312 are satisfied.

Figure 8:
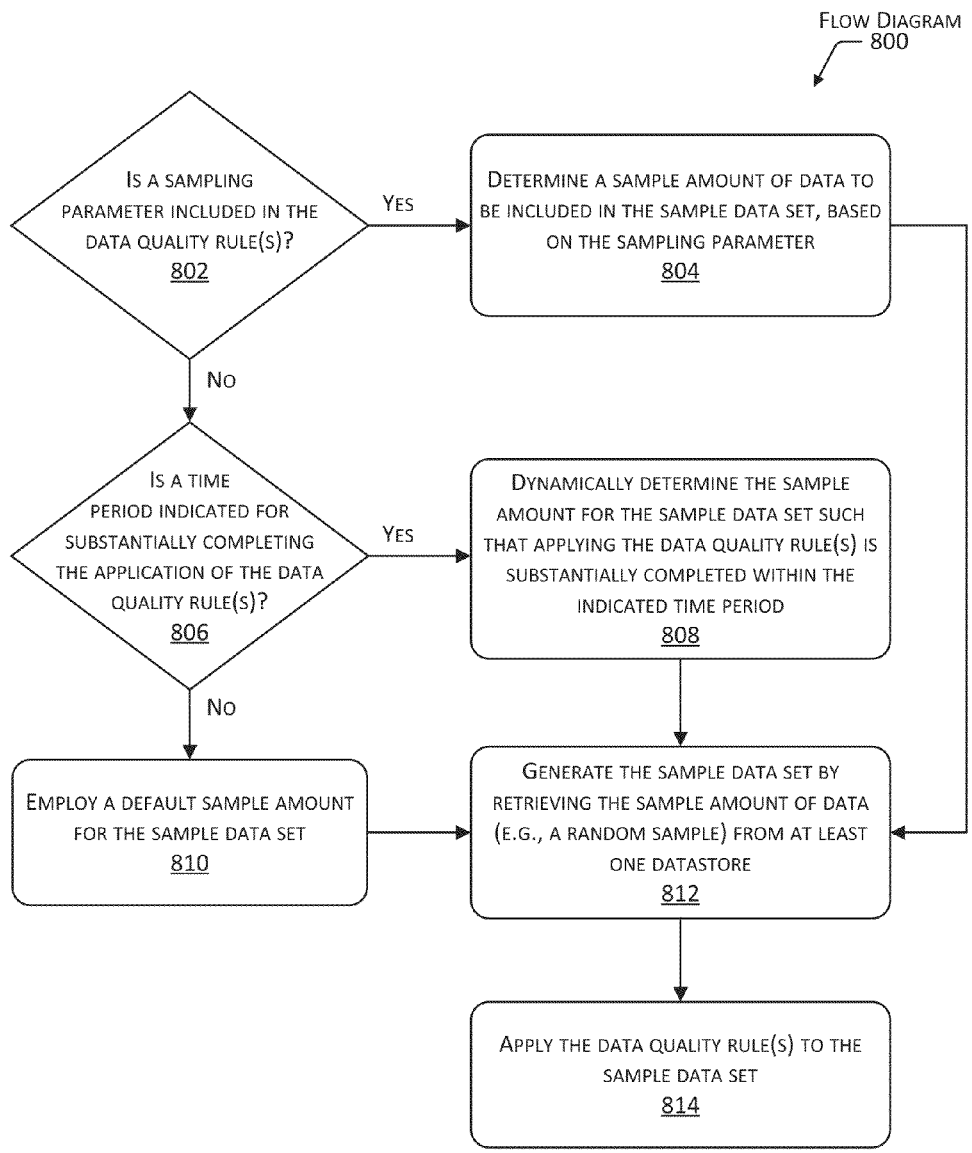
FIG. 8 depicts a flow diagram of a process for determining a sample set of data for applying the data quality rule(s).

FIG. 8 depicts a flow diagram 800 of a process for determining a sample set of data for applying the data quality rule(s) 108. Operations included in the process may be performed on one or more of the user device(s) 102, the data quality server device(s) 104, or the data storage system(s) 112. Operations performed on the data quality server device(s) 104 may be performed by the rule management interface module 106, the rule application module 110, or other modules.

At 802, a determination is made whether one or more sampling parameters 310 are included in the data quality rule(s) 108 to be applied. If so, then at 804 a sample amount of data to be included in the sample data set is determined based on the sampling parameter(s) 310. As described above, the sampling parameter(s) 310 may indicate a relative amount of data to include in the sample data set, such as a proportion or percentage of the data stored in the datastore 114. Alternatively, the sampling parameter(s) 310 may indicate a particular, absolute amount of data (e.g., 1 gigabyte) to include in the sample data set. In some cases, the sampling parameter(s) 310 may indicate a sample amount based on a time period, such as an amount of data written to the datastore 114 during a particular day, week, month, and so forth.

If the determination at 802 is negative, then at 806 a determination is made whether there is an indication of a time period during which the application of the data quality rule(s) 108 is to be substantially completed. Such an indication may have been provided by a user, and may be included in the timing parameter(s) 316 of the data quality rule(s) 108. If so, then at 808 the sample amount of data to include in the sample data set may be dynamically determined based on the time period, such that applying the data quality rule(s) 108 is substantially completed within the time period. For example, a time period of ten minutes may be specified by a user, indicating that the application of a data quality rule 108 is to be substantially completed within ten minutes. A determination may be made that the data quality rule 108 may substantially complete within ten minutes if it is applied to a sample data set that is 0.001% of a 10 peta byte datastore (e.g., 10 gigabytes). In this way, implementations may enable a performance-based tuning of the application of the data quality rules 108.

If the determination at 806 is negative, then at 810 a default sample amount may be employed, either as a relative amount of data or an absolute quantity of data as described above. In some cases, the default sample amount may be determined based on an amount that is statistically significant as compared to a total quantity of data stored in the datastore(s) 114. Such a determination may reflect a statistical assessment as to whether the results of the application of the data quality rule(s) 108 would be substantially accurate in their determination of data quality, or whether the results may be dictated by chance. A sample amount for the sample data set may be determined to minimize the possibility of a chance-based outcome.

At 812, the sample data set is generated by retrieving the sample amount of data from the datastore(s) 114 for which data quality is to be determined. In some cases, the sample amount of data may be a random sample of the data stored in the datastore(s) 114. At 814, the data quality rule(s) 108 may be applied to the sample amount of data, as described further herein.

Figure 9:
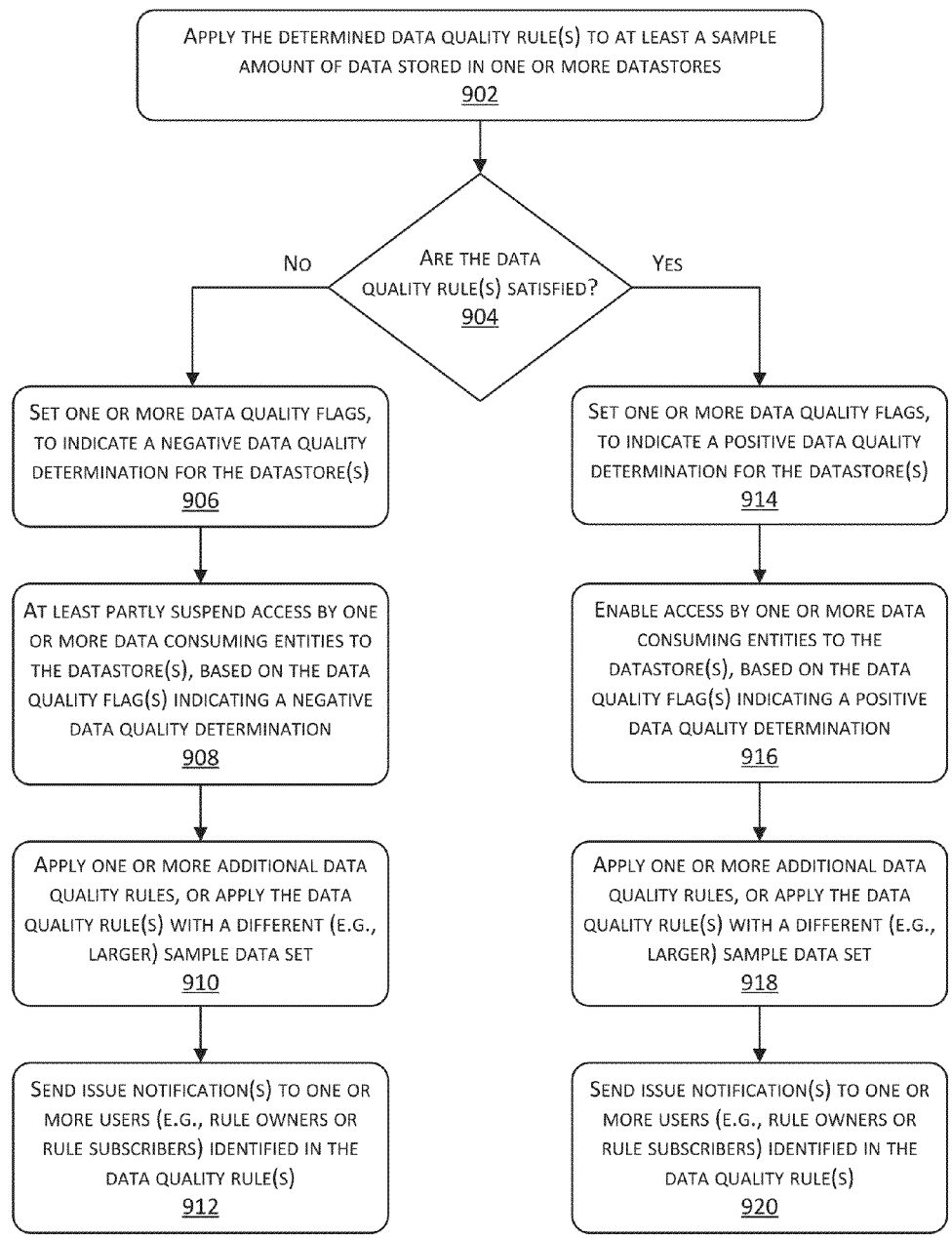
FIG. 9 depicts a flow diagram of a process for performing one or more actions based on the results of applying the data quality rule(s).

FIG. 9 depicts a flow diagram 900 of a process for performing one or more actions 314 based on the results of applying the data quality rule(s) 108. Operations included in the process may be performed on one or more of the user device(s) 102, the data quality server device(s) 104, or the data storage system(s) 112. Operations performed on the data quality server device(s) 104 may be performed by the rule management interface module 106, the rule application module 110, or other modules.

At 902, one or more data quality rules 108 are applied to a sample data set, to determine the data quality of data stored in one or more datastores 114 as described above. At 904, a determination is made whether the data quality rule(s) 108 are satisfied.

If the determination at 904 is negative, then a negative data quality may be inferred for the data stored in the datastore(s) 114, and one or more actions 314 may be performed based on that inference. Such actions 314 may include one or more of the actions described in operations 906, 908, 910, and 912.

At 906, one or more data quality flag(s) 118, or other indicia of data quality, may be set to a value that indicates a negative data quality for the datastore(s) 114, as described above. At 908, access to the datastore(s) 114 may be at least partly suspended based on the data quality flag(s) 118 indicating a negative data quality for the datastore(s) 114. This suspension may proceed as described above with reference to FIGS. 3 and 4.

At 910, in some implementations one or more additional data quality rules 108 may be applied based on the negative data quality determination. In some cases, multiple data quality rules 108 may be associated or linked to one another, such that the failure of one rule leads to the application of a related rule. Such rule associations may be described in the data quality rules 108. Alternatively, the data quality rule(s) 108 may be reapplied to test a different sample data set. This implementation is described further with reference to FIG. 10. In some implementations, the output or result of applying one or more data quality rules 108 may be employed as an input to the same or a different set of one or more data quality rules 108.

At 912, one or more issue notification(s) 124 may be sent to inform one or more users, processes, or devices that a negative data quality has been determined for the datastore(s) 114. The issue notification(s) 124 may be sent by any medium and in any format, such as emails, text messages, voice messages, faxes, issue tickets added to an issue tracking system, information provided through the rule management interface module 106, and so forth. The issue notification(s) 124 may be sent to the rule owner(s) identified by identification 306, to the rule subscriber(s) 126 identified by identification 308, to both the rule owner(s) and the rule subscriber(s) 126. In some cases, the issue notification(s) 124 may be sent to other users, such as system administrators and so forth.

As described above, the issue notification(s) 124 may include information to enable a recipient to investigate or diagnose a cause of the negative data quality, or identify a solution to correct the negative data quality. Accordingly, the issue notification(s) 124 may include a description or identification of the datastore(s) 114 to which the data quality rule(s) 108 were applied, the sample data set tested, the data quality rule(s) 108 applied, a date and time when the data quality rule(s) 108 were applied, and so forth.

The action(s) 314 may include one or more of the actions described in operations 906, 908, 910, and 912, performed in any order, and implementations are not limited to performing all such operations. For example, in some implementations an issue notification 124 may be sent following a determination of negative data quality for a datastore 114, even though access to the datastore 114 is not suspended.

If the determination at 904 is positive, then a positive data quality may be inferred for the data stored in the datastore(s) 114, and one or more actions 314 may be performed based on that inference. Such actions 314 may include one or more of the actions described in operations 914, 916, 918, and 920, which may be performed in any order. Implementations are not limited to performing all such operations.

At 914, one or more data quality flag(s) 118, or other indicia of data quality, may be set to a value that indicates a positive data quality for the datastore(s) 114, as described above. At 916, access to the datastore(s) 114 may be at least partly enabled based on the data quality flag(s) 118 indicating a positive data quality for the datastore(s) 114. This enabling of access may proceed as described above with reference to FIGS. 3 and 4.

Implementations support either or both of a default positive or default negative configuration for controlling access to the datastore(s) 114. For example, in some implementations a data quality flag 118 may indicate a negative data quality for a corresponding datastore 114 as a default, until the stored data is tested and a positive data quality is determined. Following the determination of the positive data quality, the data quality flag 118 may be set to a value indicating a positive data quality, and access to the datastore 114 may be enabled. Alternatively, in some implementations the data quality flag 118 may indicate a positive data quality for the datastore 114 as a default, until the stored data is tested and a negative data quality is determined. Following the determination of the negative data quality, the data quality flag 118 may be set to a value indicating a negative data quality, and access to the datastore 114 may be at least partly suspended.

At 918, in some implementations one or more additional data quality rules 108 may be applied based on the positive data quality determination. In some cases, multiple data quality rules 108 may be associated or linked to one another, such that the positive result of one rule leads to the application of a related rule. Such rule associations may be described in the data quality rules 108. Alternatively, the data quality rule(s) 108 may be reapplied to test a different sample data set. In some implementations, the output or result of applying one or more data quality rules 108 may be employed as an input to the same or a different set of one or more data quality rules 108.

At 920, one or more issue notification(s) 124 may be sent to inform one or more users, processes, devices, or other entities that a positive data quality has been determined for the datastore(s) 114. The issue notification(s) 124 may be sent to rule owner(s), rule subscriber(s), or other users as described above. In some implementations, the issue notification(s) 124 may be sent based on a determination of negative data quality and may not be sent based on a determination of positive data quality. Alternatively, the issue notification(s) 124 may be sent based on a determination of positive data quality and may not be sent based on a determination of negative data quality. In some implementations, the issue notification(s) 124 may be sent based on a determination of positive or negative data quality.

Figure 10:
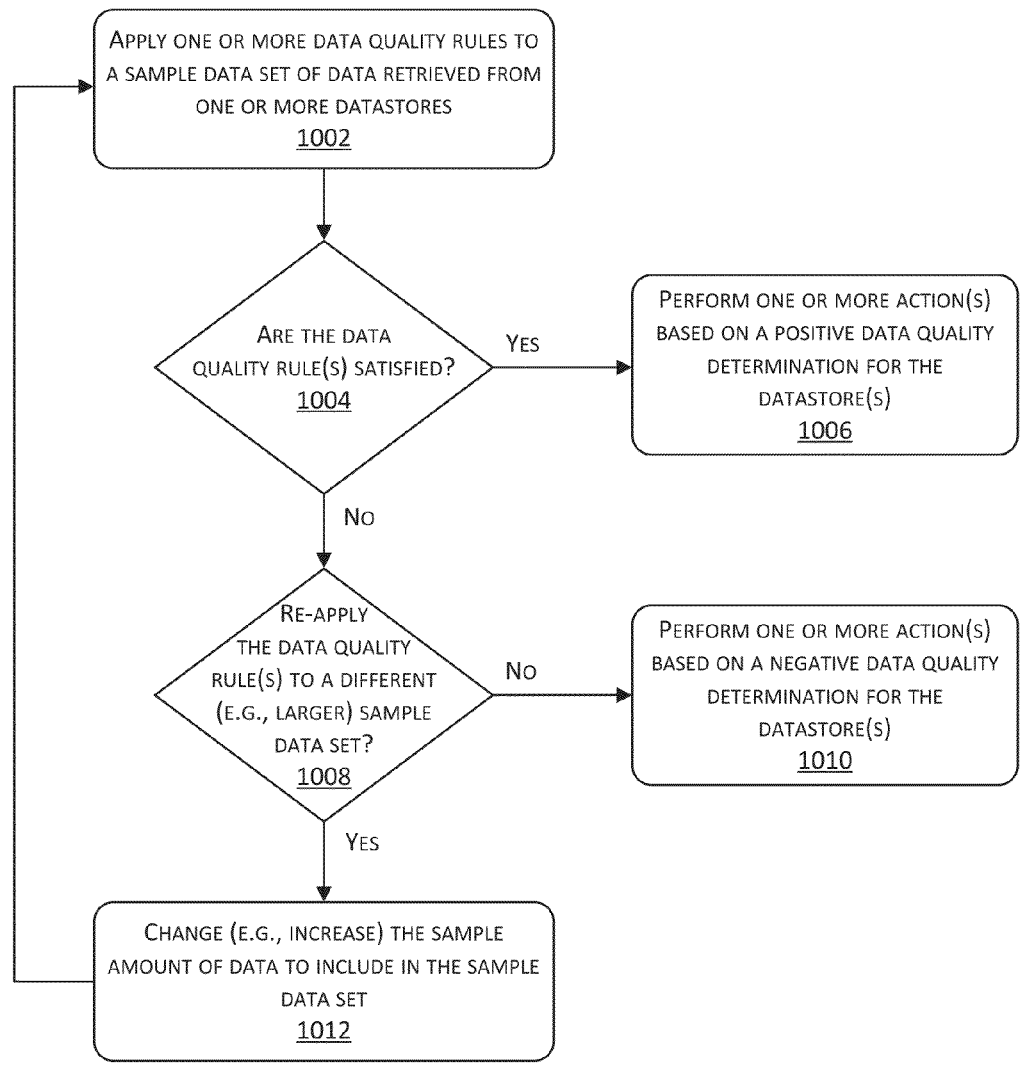
FIG. 10 depicts a flow diagram of a process for iteratively applying the data quality rule(s) to sample data sets of varying sizes, based on the results of one or more previous applications of the data quality rule(s).

FIG. 10 depicts a flow diagram 1000 of a process for iteratively applying the data quality rule(s) 108 to sample data sets of varying size, based on the results of previous applications of the data quality rule(s) 108. Operations included in the process may be performed on one or more of the user device(s) 102, the data quality server device(s) 104, or the data storage system(s) 112. Operations performed on the data quality server device(s) 104 may be performed by the rule management interface module 106, the rule application module 110, or other modules.

At 1002, one or more data quality rules 108 may be applied to a sample data set retrieved from one or more datastore(s) 114, as described above. At 1004, a determination is made whether the data quality rule(s) 108 are satisfied. If so, at 1006 one or more actions 314 may be performed based on a positive data quality determination as described above.

If the determination at 1004 is negative, at 1008 a determination may be made whether to re-apply the data quality rule(s) 108 to a different sample data set retrieved from the datastore(s) 114. If the determination at 1008 is negative, at 1010 one or more actions 314 may be performed based on a negative data quality determination as described above.

If the determination at 1008 is positive, then the sample amount may be changed to generate a different sample data set for determining the data quality of the datastore(s) 114. In some implementations, the sample amount may be increased at 1012 to provide for a larger sample data set. The process may then return to 1002, and re-apply the data quality rule(s) 108 to the larger sample data set.

In this way, the process may iterate until a positive data quality determination is made at 1004, or until a determination is made at 1008 to stop iterating. Some implementations may support a maximum number of iterations, which may be tuned automatically or manually based on system performance. Some implementations may perform such iterations until the sample data set reaches a certain threshold (e.g., maximum) size. This threshold size may also be tuned automatically or manually based on system performance.

Some implementations may employ supervised or unsupervised machine learning techniques to tune existing data quality rules 108, or generate new data quality rules 108, based on the results of previous applications of data quality rules 108. Such machine learning techniques may analyze a current set of data quality rule(s) 108 and identify one or more elements (e.g., mathematical conditions, and so forth) that are shared by different rules. Based on the identified common elements, one or more new data quality rules 108 may be extrapolated and applied to determine data quality.

Moreover, in some cases, data stored in the datastore(s) 114 may be analyzed and data quality rule(s) 108 may be extrapolated based on that data. For example, in a particular datastore 114 one or more data attributes may be identified as suitable targets for data quality determination using one or more new data quality rules 108. Machine learning techniques may then be employed to automatically determine one or more mathematical conditions 312, one or more sampling parameters 310, and other elements of the new data quality rules(s) 108 based on the data stored in the identified data attribute(s).

Those having ordinary skill in the art will readily recognize that certain steps or operations illustrated in the figures above can be eliminated, combined, subdivided, executed in parallel, or taken in an alternate order. Moreover, the methods described above may be implemented as one or more software programs for a computer system and are encoded in one or more computer-readable storage media as instructions executable on one or more processors.

Separate instances of these programs may be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments, and situations. Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A system, comprising:
at least one memory storing computer-executable instructions; and
at least one processor in communication with the at least one memory, the at least one processor configured to access the at least one memory and execute the computer-executable instructions to:
access at least one data quality rule stored in the at least one memory, the at least one data quality rule applying one or more statistical measures of data quality of data stored in at least one datastore, the at least one data quality rule including:
an identification of at least a portion of the data stored in the at least one datastore;
a sampling parameter indicating a sample amount of the at least a portion of the data to include in a sample data set, wherein the sample amount includes one or more of a proportion or percentage of the at least a portion of the data;
at least one mathematical condition applicable to the sample data set, wherein the at least one mathematical condition includes at least one condition that a current size of the sample data set is within a predetermined margin of a historical average size of the sample data set; and
an identification of at least one subscriber associated with the at least one data quality rule;
generate the sample data set by identifying the sample amount of the at least a portion of the data in the at least one datastore;
determine whether the at least one mathematical condition is satisfied for the sample data set;
based on determining that the at least one mathematical condition is not satisfied, suspend access to the at least one datastore by setting at least one data quality flag in the at least one memory to a value indicating a negative data quality for at least a portion of the data stored in the at least one datastore; and
send at least one notification to the at least one subscriber, the at least one notification indicating that the at least one data quality rule is not satisfied for the at least one datastore.

2. The system of claim 1, wherein the at least one datastore includes at least one relational datastore and at least one non-relational datastore.

3. The system of claim 1, wherein the at least one mathematical condition includes at least one condition that a current count of records for which a data attribute stores a particular value is within a predetermined margin of a historical average count of records for which the data attribute stores the particular value, the records being included in the sample data set.

4. A computer-implemented method, comprising:
accessing at least one data quality rule stored in at least one memory, the at least one data quality rule being applicable to determine at least one statistical measure of data quality of data stored in at least one datastore, the at least one data quality rule including:
a sampling parameter that indicates a sample amount of the data to include in a sample data set; and
at least one mathematical condition applicable to the sample data set;
applying the at least one data quality rule to the data stored in the at least one datastore, including:
generating the sample data set by identifying the sample amount of the data in the at least one datastore; and
determining whether the at least one mathematical condition is satisfied for the sample data set, wherein the at least one mathematical condition includes at least one condition that a current size of the sample data set is within a predetermined margin of a historical size of the sample data set; and
based on determining that the at least one mathematical condition is not satisfied, setting at least one data quality flag in the at least one memory to a first value indicating a negative data quality for at least a portion of the data stored in the at least one datastore.

5. The method of claim 4, further comprising:
based on determining that the at least one mathematical condition is satisfied, setting the at least one data quality flag in the at least one memory to a second value indicating a positive data quality for the at least one datastore.

6. The method of claim 4, further comprising:
suspending access of at least one data consuming entity to at least a portion of the data stored in the at least one datastore, based on the at least one data quality flag being set to the first value indicating the negative data quality for at least a portion of the data stored in the at least one datastore.

7. The method of claim 4, wherein:
the at least one data quality rule further comprises a timing parameter that indicates at least one start time at which to apply the at least one data quality rule; and
the applying of the at least one data quality rule is performed at the at least one start time.

8. The method of claim 4, wherein the at least one data quality rule further comprises an identification of the at least one datastore to which the at least one data quality rule is to be applied.

9. The method of claim 4, wherein the sampling parameter specifies the sample amount as a proportion of the data stored in the at least one datastore.

10. The method of claim 4, wherein the sampling parameter specifies the sample amount as an amount of the data stored in the at least one datastore during a period of time.

11. The method of claim 4, wherein the historical size of the sample data set comprises a historical average size.

12. The method of claim 4, wherein the at least one mathematical condition includes at least one condition that a current count of records for which a data attribute stores a particular value is within a predetermined margin of a historical average count of records for which the data attribute stores the particular value, the records being included in the sample data set.

13. One or more non-transitory computer-readable media storing instructions which, when executed, instruct at least one processor to perform actions comprising:
accessing at least one data quality rule stored in at least one memory, the at least one data quality rule being applicable to determine data quality of at least a portion of data stored in at least one datastore, the at least one data quality rule including at least one mathematical condition;
applying the at least one data quality rule to at least the portion of the data stored in the at least one datastore, the applying including:
identifying the at least a portion of the data stored in the at least one datastore;
identifying a first sample data set including a first sample amount of the at least a portion of the data stored in the at least one datastore; and
applying the at least one mathematical condition to the first sample data set to generate one or more results, wherein the at least one mathematical condition includes at least one condition that a current size of the first sample data set is within a predetermined margin of a historical size of the first sample data set; and
based on the one or more results, setting at least one data quality flag in the at least one memory to a first value indicating a first data quality of the at least the portion of the data stored in the at least one datastore.

14. The one or more non-transitory computer-readable media of claim 13, wherein the first value indicates a negative data quality of the at least the portion of the data stored in the at least one datastore, the actions further comprising:
based on the at least one data quality flag being set to the first value, at least partly suspending access by at least one data consuming entity to the at least one datastore.

15. The one or more non-transitory computer-readable media of claim 13, wherein the first sample data set includes a random sample of the data stored in the at least one datastore.

16. The one or more non-transitory computer-readable media of claim 13, wherein the at least one data quality rule further comprises a sampling parameter that indicates the first sample amount.

17. The one or more non-transitory computer-readable media of claim 13, the actions further comprising:
    receiving an indication of a time period in which the at least one data quality rule is to be applied; and
    dynamically determining the first sample amount, such that the applying of the at least one data quality rule is substantially completed within the time period.

18. The one or more non-transitory computer-readable media of claim 13, the actions further comprising:
    based on the one or more results, re-applying the at least one data quality rule to the at least one datastore, the re-applying including:
        identifying a second sample data set including a second sample amount of the at least a portion of the data stored in the at least one datastore, the second sample amount being different than the first sample amount; and
        applying the at least one mathematical condition to the second sample data set to generate one or more additional results; and
    based on the one or more additional results, setting the at least one data quality flag to a second value indicating a second data quality of the at least the portion of the data stored in the at least one datastore.

19. The one or more non-transitory computer-readable media of claim 18, wherein the second sample amount is greater than the first sample amount.

20. The one or more non-transitory computer-readable media of claim 13, wherein the at least one mathematical condition includes at least one condition that a current size of the first sample data set is within a predetermined margin of a historical average size of the first sample data set.

\* \* \* \* \*